United States Patent
Li et al.

(10) Patent No.: US 12,241,785 B2
(45) Date of Patent: Mar. 4, 2025

(54) COLOR CORRECTION SYSTEM AND COLORIMETER POSITIONING METHOD THEREOF

(71) Applicant: Qisda Corporation, Taoyuan (TW)

(72) Inventors: Jia Hsing Li, Taoyuan (TW); Chi Yao Hsu, Taoyuan (TW); Feng-Lin Chen, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 65 days.

(21) Appl. No.: 18/317,935

(22) Filed: May 16, 2023

(65) Prior Publication Data
US 2024/0094058 A1 Mar. 21, 2024

(30) Foreign Application Priority Data
Sep. 19, 2022 (CN) .......................... 202211135451.7

(51) Int. Cl.
*G01J 3/50* (2006.01)
*G09G 3/20* (2006.01)

(52) U.S. Cl.
CPC ............ *G01J 3/506* (2013.01); *G09G 3/2003* (2013.01); *G09G 2320/0666* (2013.01)

(58) Field of Classification Search
CPC .................. G01J 3/506; G09G 3/2003; G09G 2320/0666; G09G 5/02; G09G 2320/0242; G09G 2320/0693
See application file for complete search history.

(56) References Cited

U.S. PATENT DOCUMENTS

| | | | |
|---|---|---|---|
| 2005/0062756 A1* | 3/2005 | Dyke | H04N 1/6077 345/604 |
| 2007/0242064 A1* | 10/2007 | Kuo | G09G 3/2003 345/207 |
| 2010/0188418 A1* | 7/2010 | Sakai | G01J 1/4204 345/589 |
| 2010/0321747 A1* | 12/2010 | Sakamoto | G01J 3/462 358/518 |
| 2019/0132489 A1* | 5/2019 | Liao | G09G 5/006 |
| 2021/0056877 A1* | 2/2021 | Chew | F16M 11/2021 |
| 2021/0312882 A1* | 10/2021 | Wu | G09G 3/2003 |

FOREIGN PATENT DOCUMENTS

CN 113643646 11/2021

* cited by examiner

*Primary Examiner* — Dmitriy Bolotin (57) ABSTRACT

A color correction system and a colorimeter positioning method therefore are provided. A first color block is displayed in a first display area of a display. During the period of displaying the first color block, a first sensing value is acquired for the first color block through a sensor of a colorimeter. The first sensing value is compared with a first reference value to determine whether the first sensing value meets the first specific condition. In response to the first sensing value meeting the first specific condition, a second color block is displayed in the first display area of the display. During the period of displaying the second color block, a second sensing value is acquired for the second color block through the sensor. The second sensing value is compared with a second reference value to determine whether the second sensing value meets the second specific condition.

20 Claims, 8 Drawing Sheets

COLOR CORRECTION SYSTEM AND COLORIMETER POSITIONING METHOD THEREOF

CROSS-REFERENCE TO RELATED APPLICATION

This application claims the priority benefit of China application serial no. 202211135451.7, filed on Sep. 19, 2022. The entirety of the above-mentioned patent application is hereby incorporated by reference herein and made a part of this specification.

BACKGROUND

Technical Field

The disclosure relates to a color correction technology, and in particular relates to a color correction system and colorimeter positioning method therefore.

Description of Related Art

Most of the various types of electronic display devices sold in the market require panel color correction through a display colorimeter to avoid color unevenness or color shift in the display screen of the electronic display device. At present, not only the factory is required to perform color correction on the display to ensure the color performance of the display is good, but also consumers may regularly perform color correction on the display to maintain the color performance of the display.

During the color correction process of the display, the operator is required to place the sensor of the colorimeter on the display surface of the display, so that the colorimeter may sense the displayed color of the display. In addition, when compensating and correcting the color uniformity of the display, the operator is required to sequentially place the sensors of the colorimeter at the positions designated by the color correcting software, and at the same time required to issue a command through the input device that the colorimeter has been positioned (e.g., using the mouse to click the display option on the software operation interface), so as to control the colorimeter to start measuring data at each designated position. The above-mentioned steps are quite cumbersome and inconvenient for operators to operate, and human error is prone to occur. For example, during the manual operation of placing the colorimeter on the display, the colorimeter may not be accurately placed in the designated position expected by the color correcting software, resulting in unsatisfactory color correcting results.

SUMMARY

In view of this, the disclosure proposes a color correction system and a colorimeter positioning method thereof, which may solve the above-mentioned technical problems, thereby providing an efficient and accurate display color correcting method.

An embodiment of the disclosure provides a colorimeter positioning method, which includes the following operation. A first color block is displayed in a first display area of multiple display areas of a display. During a period of displaying the first color block, a first sensing value is acquired for the first color block through a sensor of a colorimeter. The first sensing value is compared with a first reference value associated with the first color block to determine whether the first sensing value meets a first specific condition. In response to the first sensing value meeting the first specific condition, a second color block is displayed in the first display area of the display. During a period of displaying the second color block, a second sensing value is acquired for the second color block through the sensor. The second sensing value is compared with a second reference value associated with the second color block to determine whether the second sensing value meets a second specific condition.

An embodiment of the disclosure provides a color correction system, which includes a colorimeter, a display, a storage device, and a processor. The colorimeter includes a sensor, and the display includes multiple display areas. The storage device records multiple modules. The processor is coupled to the colorimeter, the display, and the storage device, and is configured to perform the following operation. The display is controlled to display a first color block in a first display area of the display areas. During a period of displaying a first color block, a first sensing value is acquired for the first color block through the sensor. The first sensing value is compared with a first reference value associated with the first color block to determine whether the first sensing value meets a first specific condition. In response to the first sensing value meeting the first specific condition, it is determined to perform a color correction operation on the first display area of the display through the colorimeter. Alternatively, in response to the first sensing value not meeting the first specific condition, it is determined not to perform the color correction operation on the first display area of the display.

Based on the above, in the embodiment of the disclosure, the first color block displayed in one of the display areas may be used to remind the user about the placement position of the sensor of the colorimeter. During the display period of the first color block on the display, it may be determined whether the sensor of the colorimeter is placed in the correct position according to the first sensing value acquired for the first color block, so as to determine whether to automatically perform the color correction operation for the display area displaying the first color block. In addition, when the first sensing value meets the first specific condition, the display may also continuously display the second color block in the same display area. Therefore, the second sensing value acquired for the second color block may be used to further confirm whether the sensor of the colorimeter is placed on the correct position, so as to determine whether to automatically perform color correction operation for the display area displaying the first color block and the second color block. Based on this, by sequentially displaying prompt color blocks in multiple display areas, human error may be avoided, so that the color correction result of the display meets expectations. Moreover, the operator of the colorimeter does not need to manually input a command to start the color correction operation, which may greatly improve the efficiency of the color correcting process.

DETAILED DESCRIPTION OF DISCLOSED EMBODIMENTS

A portion of the embodiments of the disclosure will be described in detail with reference to the accompanying drawings. Element symbol referenced in the following description will be regarded as the same or similar element when the same element symbol appears in different drawings. These examples are only a portion of the disclosure and do not disclose all possible embodiments of the disclosure. More precisely, these embodiments are only examples of the method and system within the scope of the patent application of the disclosure.

In addition, terms "first," "second" and the like mentioned in the full text (including the scope of the patent application) of the description of this application are used only to name the elements or to distinguish different embodiments, scopes, or elements, and are not intended to limit the upper or lower limit of the number of the elements, nor is it intended to limit the order of the elements.

Figure 1:
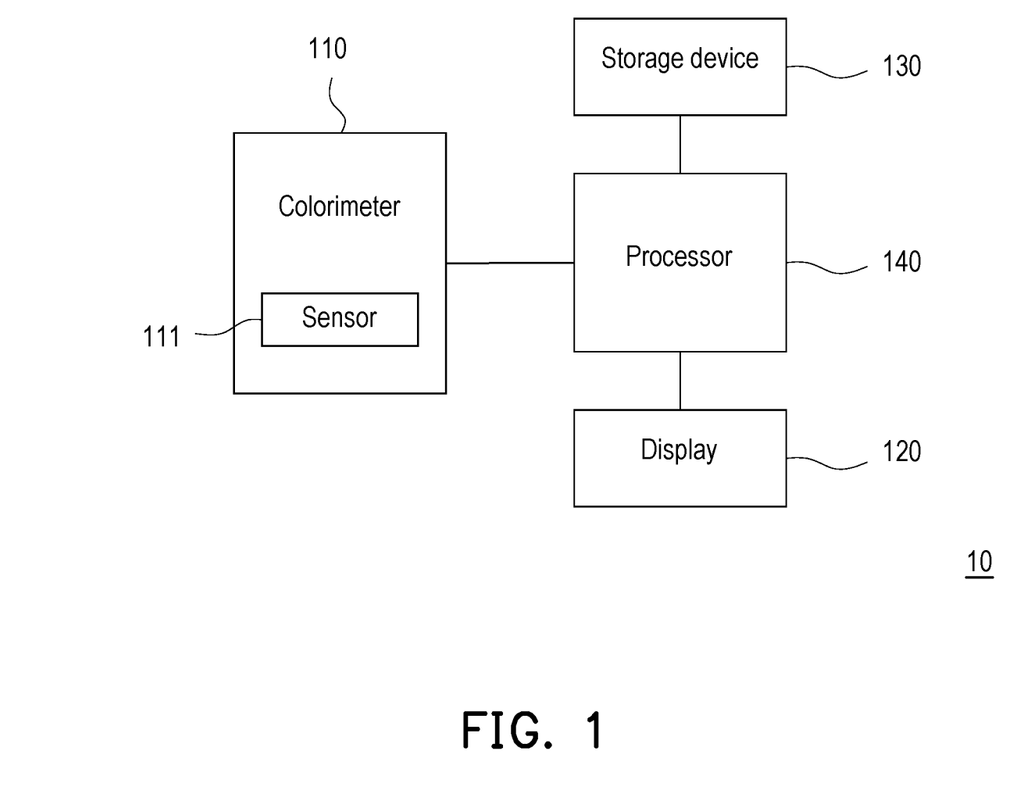
FIG. 1 is a block diagram of a color correction system according to an embodiment of the disclosure.

FIG. 1 is a block diagram of a color correction system according to an embodiment of the disclosure. Referring to FIG. 1, the color correction system 10 includes a colorimeter 110, a display 120, a storage device 130, and a processor 140. The processor 140 is coupled to the colorimeter 110, the display 120, and the storage device 130. In some embodiments, the display 120 may be an external display, which may be connected to the computer system including the storage device 130 and the processor 140. Alternatively, in some other embodiments, the display 120, the storage device 130, and the processor 140 may be integrated into an electronic display device with computing power, such as a mobile phone, a gaming console, a smart TV, a notebook computer, a tablet computer, or a desktop computer, etc., but not limited thereto.

The colorimeter 110 includes a sensor 111 and may be used to sense the display color, brightness, color temperature, or graphics presented by the display 120. For example, the colorimeter 110 may be a contact color analyzer. In some embodiments, the colorimeter 110 may be connected to a computer system including the processor 140 through a universal serial bus (USB) or other communication interfaces. The sensor 111 may include a photosensitive element, such as a charge coupled device (CCD), a complementary metal-oxide semiconductor (CMOS) element or other elements, which is not limited in the disclosure.

The display 120 may be various types of displays such as a liquid crystal display (LCD), a light-emitting diode (LED) display, an organic light-emitting diode (OLED) display, etc., which is not limited in the disclosure.

The storage device 130 records multiple modules. Specifically, the storage device 130 is used to store data and program codes (e.g., operating systems, application programs, drivers) accessed by the processor 140, which may be, for example, any type of fixed or removable random access memory (RAM), read-only memory (ROM), flash memory, a hard disk, or a combination thereof.

The processor 140 is, for example, a central processing unit (CPU), an application processor (AP), or other programmable general-purpose or special-purpose microprocessor, a digital signal processor (DSP), an image signal processor (ISP), a graphics processing unit (GPU) or other similar devices, integrated circuits, and combinations thereof. The processor 140 may access and execute the modules, program codes, or software elements recorded in the storage device 130 to implement the colorimeter positioning method in the embodiment of the disclosure.

Figure 2:
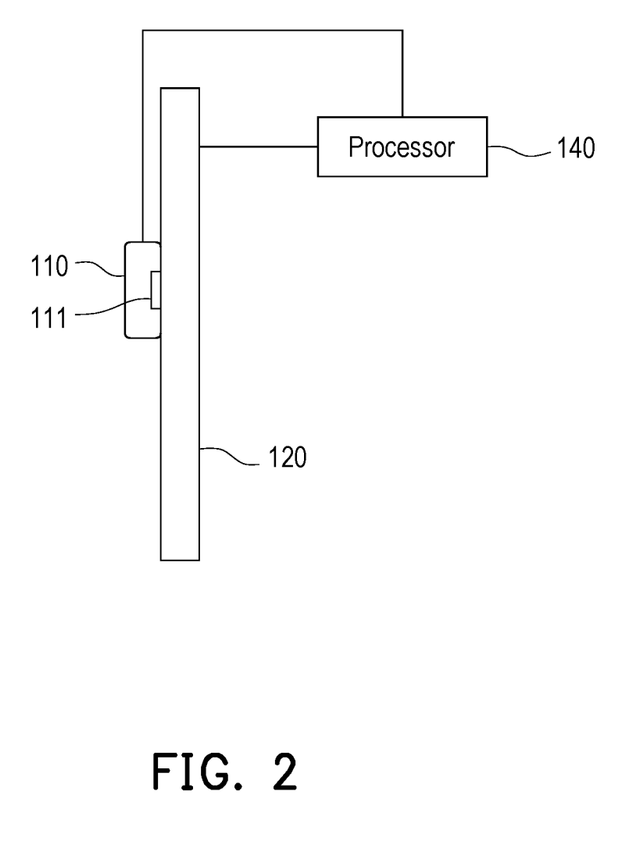
FIG. 2 is a schematic diagram of using a colorimeter according to an embodiment of the disclosure.

FIG. 2 is a schematic diagram of using a colorimeter according to an embodiment of the disclosure. Referring to FIG. 2, the colorimeter 110 may be suspended in front of the display surface of the display 120, so that the sensor 111 may perform color sensing, brightness sensing, or shape sensing on the image presented by the display 120. The colorimeter 110 may send the sensing data back to the processor 140 so that the processor 140 may correct the color performance of the display 120 according to the sensing data provided by the colorimeter 110. In some embodiments, during the color correction operation, the display 120 may sequentially display multiple colors for the color correction device 110 to sense. For example, the display 120 may display red, blue, green, white, and black in sequence. Correspondingly, the colorimeter 110 also sequentially senses the above display colors. In this way, the processor 140 may adjust the display parameters of the display 120 according to the sensing color coordinates and the corresponding target color coordinates provided by the colorimeter 110.

Figure 3:
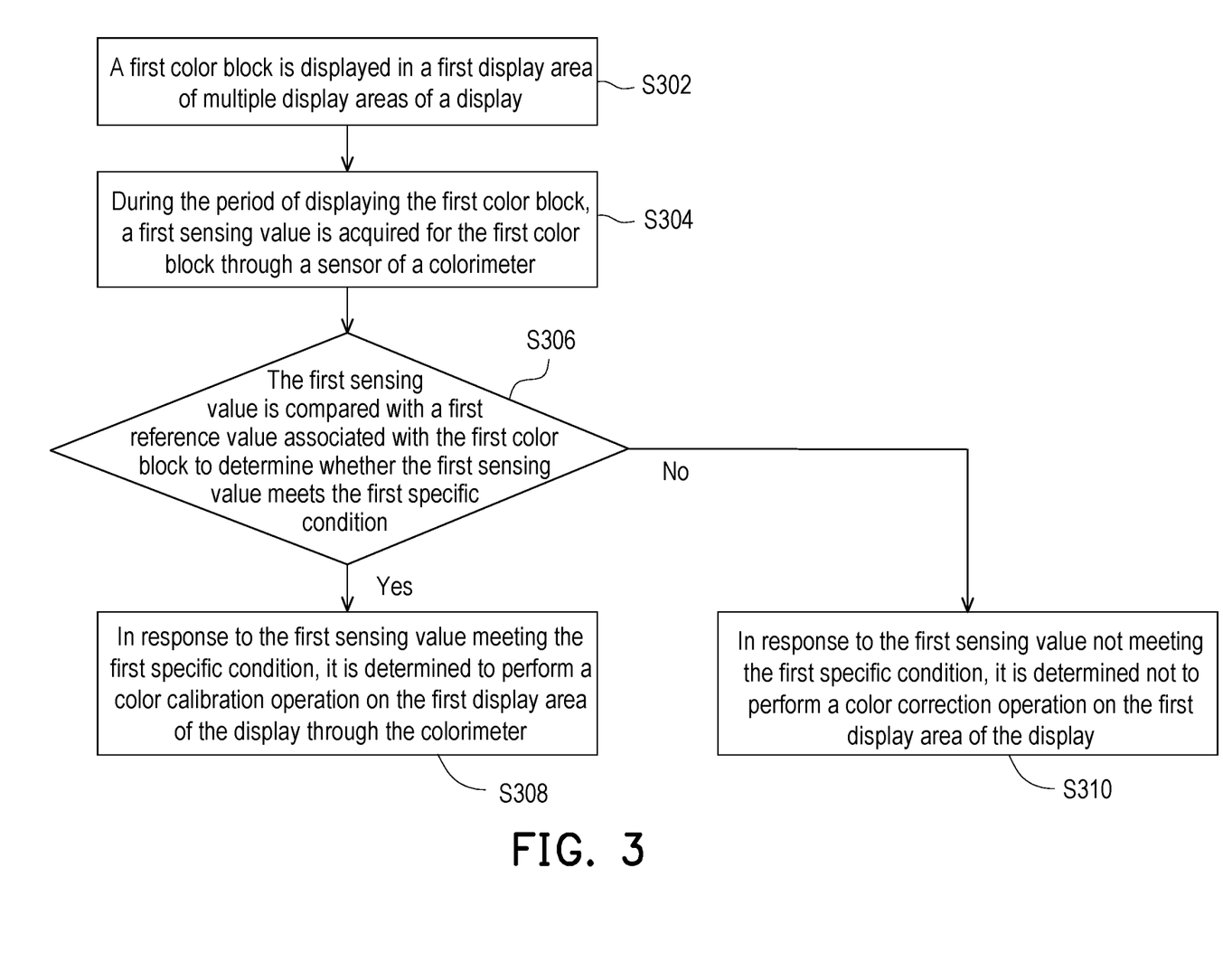
FIG. 3 is a flowchart of a colorimeter positioning method according to an embodiment of the disclosure.

FIG. 3 is a flowchart of a colorimeter positioning method according to an embodiment of the disclosure, and the process of the method in FIG. 3 may be implemented by various elements of the color correction system 10 in FIG. 1. The steps of the colorimeter positioning method in this embodiment are described below in combination with various elements of the color correction system 10 in FIG. 1.

In step S302, a first color block is displayed in a first display area of multiple display areas of a display 120. In detail, the display 120 may include multiple display areas. However, the disclosure does not limit the dividing method and the quantity of the display areas, which may be configured according to actual applications and requirements. The processor 140 may control the display 120 to display the first color block in the first display area of the display areas. In different embodiments, the first color block may or may not fill the first display area. The shape and color of the first color block may be configured according to actual application and requirements. For example, the first color block may be black or white.

In step S304, during a period that the display 120 is displaying the first color block, the processor 140 acquires a first sensing value for the first color block through the sensor 111 of the colorimeter 110. Specifically, by displaying the prompt of the first color block on the display 120, the operator may know to place the colorimeter 110 on the first display area displaying the first color block. Therefore, the colorimeter 110 may sense the first color block in the first display area to acquire the first sensing value, and provide the first sensing value to the processor 140. In addition, during the period of displaying the first color block, one or more second display areas different from the first display area of the display areas do not display or fully display the first color block, or do not display or fully display the color of the first color block. Based on this, the operator may know the correct placement position of the colorimeter 110 according to the position of the first color block. Furthermore, the area of the detectable area of the sensor 111 must be equal to or less than the area of the first color block displayed on the display 120, so the first color block may be accurately sensed, and the slight error in the positioning of the colorimeter 110 by the operator during operation results in a positioning sensing error.

In step S306, the processor 140 compares the first sensing value with a first reference value associated with the first color block to determine whether the first sensing value meets the first specific condition. Specifically, by comparing the first sensing value and the first reference value provided by the colorimeter 110, the processor 140 may determine whether the colorimeter 110 is sensing the first color block, to know whether the colorimeter 110 is placed in the correct position. Generally speaking, the correct position is the center of the first display area. When the first sensing value meets the first specific condition, it means that the colorimeter 110 is placed at the correct position. Otherwise, when the first sensing value does not meet the first specific condition, it means that the colorimeter 110 is not placed in the correct position.

In some embodiments, the first sensing value may include a color coordinate component or a brightness value in a color coordinate system. That is, in some embodiments, by comparing the color coordinate component provided by the colorimeter 110 with the corresponding first reference value, the processor 140 may determine whether the first sensing value meets the first specific condition. The color coordinate system is, for example, a CIE-XYZ color coordinate system or an RGB color coordinate system, but is not limited thereto. The color coordinate components are, for example, X component, Y component, or Z component of the CIE-XYZ color coordinates, or R component, G component, or B component of the RGB color coordinates. Alternatively, in some other embodiments, by comparing the brightness value provided by the colorimeter 110 with the corresponding first reference value, the processor 140 may determine whether the first sensing value meets the first specific condition.

In some embodiments, the first specific condition includes that the first sensing value is within a numerical range based on the first reference value. That is, the processor 140 may determine whether the first sensing value is within a numerical range based on the first reference value. In some embodiments, the processor 140 may determine whether the first sensing value is greater than or less than a first reference value. Alternatively, in some other embodiments, the processor 140 may determine whether the difference between the first sensing value and the first reference value is less than a preset value.

For example, assuming that the first color block is a black block, the processor 140 may determine whether the brightness value provided by the color corrector 110 is less than a first reference value associated with the black block. When the brightness value provided by the colorimeter 110 is less than the first reference value associated with the black block, the processor 140 may determine that the first sensing value (i.e., the brightness value) meets the first specific condition. When the brightness value provided by the colorimeter 110 is not less than the first reference value associated with the black block, the processor 140 may determine that the first sensing value (i.e., the brightness value) does not meet the first specific condition. In this case, the first reference value may be regarded as a brightness threshold.

If the first sensing value meets the first specific condition (determined as "Yes" in step S306), continue to step S308. In step S308, in response to the first sensing value meets the first specific condition, the processor 140 determines to perform a color correction operation on the first display area of the display 120 through the colorimeter 110. During the execution of the color correction operation, the processor 140 may control the display 120 to display one or more colors in the first display area, and synchronously control the colorimeter 110 to sense these displayed colors, so as to acquire the sensing data acquired for the first display area.

On the other hand, if the first sensing value does not meet the first specific condition (determined as "No" in step S306), continue to step S310. In step S310, in response to the first sensing value does not meet the first specific condition, the processor 140 determines not to perform a color correction operation on the first display area of the display 120. That is to say, if the first sensing value does not meet the first specific condition, it means that the colorimeter 110 is not placed in the correct position, so the processor 140 may not start the color correction operation associated with the first display area, so as to avoid incorrectly correcting the color performance of the display 120 according to wrong sensing data.

In addition, in some embodiments, the first sensing value may include multiple first sensing data. Specifically, the processor 140 may control the colorimeter 110 to perform multiple sensing on the first color block within a preset period of time to correspondingly acquire multiple pieces of first sensing data. In order to ensure that the colorimeter 110 is stably placed in front of the first display area, the processor 140 may continuously determine whether the first sensing data meets the first specific condition within a preset period of time. In response to at least part of the first sensing data meeting the first specific condition within a preset period of time, the processor 140 may decide to perform a color correction operation on the first display area of the display 120 through the colorimeter 110. That is to say, when all or at least a portion of the first sensing data provided by the colorimeter 110 in a preset period of time meets the first specific condition, it means that the colorimeter 110 is stably placed on the first display area, so the processor 140 may determine to perform a color correction operation on the first display area through the colorimeter 110. The aforementioned preset period of time is, for example, 3 seconds or 4 seconds, and the sensing performed is, for example, 2 or 3 times, which is not limited in the disclosure.

In some embodiments, after the color correction operation of the first display area is completed, the processor 140 may control the second display area of the display areas of the display 120 to display the first color block. The first display area is different from the second display area. That is to say, the processor 140 may control multiple display areas to respectively display the first color block in sequence or display the first color block in a specific display area designated by the operator, so as to prompt the operator to place the colorimeter 110 in each designated by the processor 140 in sequence on each display area designated by the processor 140. After the colorimeter 110 is stably placed in each display area, the processor 140 may perform individual color correction operations for each display area, thereby improving the color correction results of the display 120, so that each display area has accurate color correction.

Figure 4:
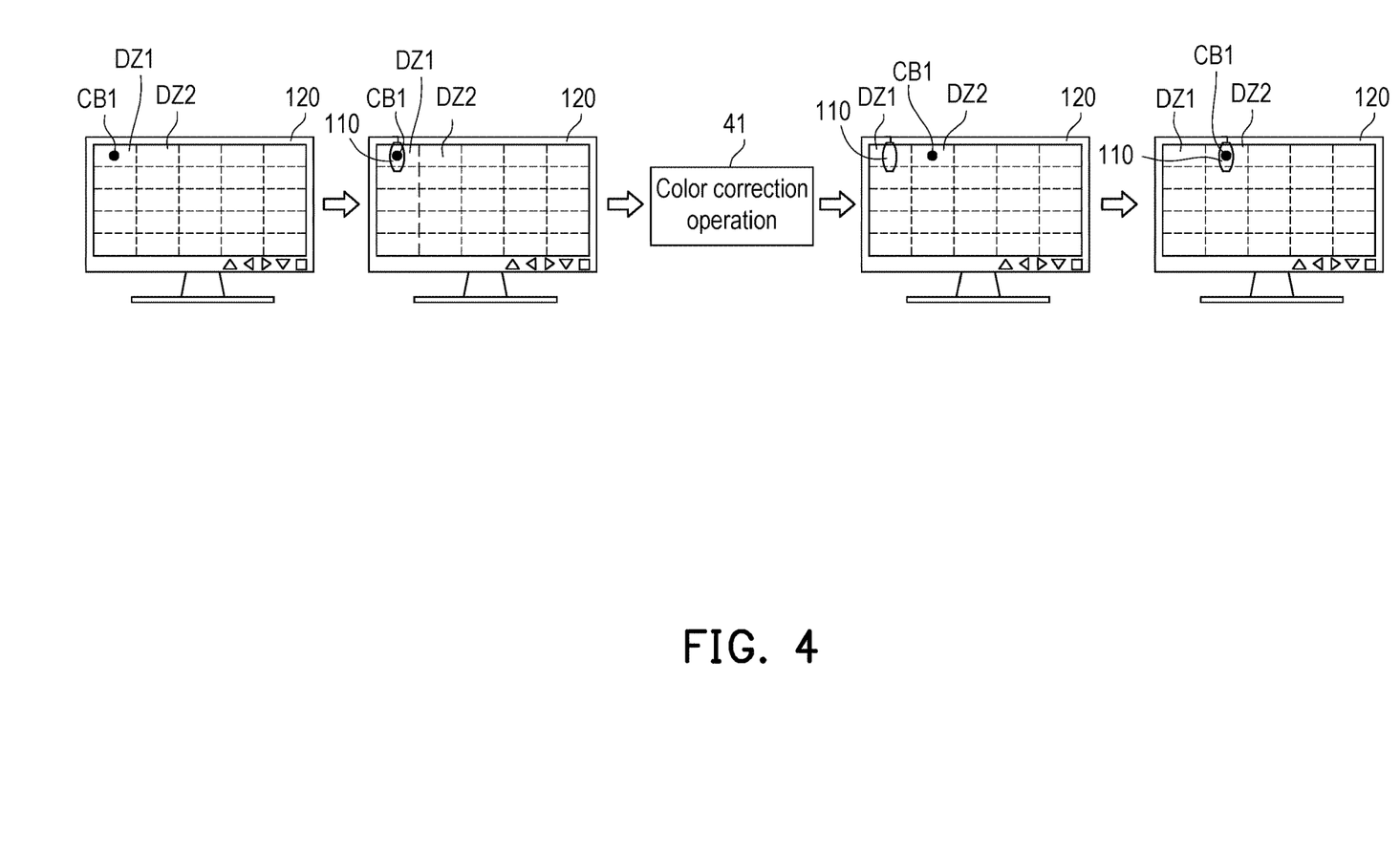
FIG. 4 is a schematic diagram illustrating the operation of a color correction system according to an embodiment of the disclosure.

FIG. 4 is a schematic diagram illustrating the operation of a color correction system according to an embodiment of the disclosure. Referring to FIG. 4, the display 120 includes multiple display areas. In this embodiment example, the display 120 may include 5*5 display areas. The processor 140 may control the display 120 to display the first color block CB1 in the first display area DZ1. In this embodiment, the first color block CB1 is described by taking a circular black block as an example, but it is not limited thereto. During the period of displaying the first color block CB1 by using the first display area DZ1, the second display area DZ2 different from the first display area DZ1 of these display areas does not display or not fully display the first color block, or does not display or not fully display the color of the first color block CB1. As shown in FIG. 4, not only does the second display area DZ2 not display or fully display the first color block CB1, but other display areas different from the first display area DZ1 do not display or fully display the first color block CB1. It may also be said that other display areas (e.g., the second display area DZ2) different from the first display area DZ1 do not display or not fully display the color of the first color block CB1.

Then, the operator may place the colorimeter 110 on the first display area DZ1 according to the prompt of the first color block CB1. In other words, the operator may cover the sensor 111 of the colorimeter 110 on the first color block CB1 in the first display area DZ1. During the period of displaying the first color block CB1, the sensor 111 of the colorimeter 110 may acquire a first sensing value for the first color block. By comparing the first sensing value with the first reference value associated with the first color block CB1, the processor 140 may determine whether the first sensing value meets the first specific condition, so as to determine whether to automatically start the color correction operation of the first display area DZ1. In this embodiment, since the first sensing value meets the first specific condition, the processor 140 may control the colorimeter 110 and the display 120 to perform the color correction operation 41.

After the color correction operation 41 of the first display area DZ1 is completed, the processor 140 may control the display 120 to display the first color block CB1 in the second display area DZ2. Since the first color block CB1 is changed to be presented in the second display area DZ2, the operator may move the colorimeter 110 from the first display area DZ1 to the second display area DZ2. In other words, the operator may cover the colorimeter 110 on the first color block CB1 in the second display area DZ2. Correspondingly, the processor 140 determines whether to automatically start the color correction operation of the second display area DZ2 according to a similar process. It should be noted that the sequence in which the first display area DZ1 moves to the second display area DZ2 is not particularly limited, and furthermore, the operator may also define the first display area DZ1 or the second display area DZ2 to be located in any one of the multiple display areas of the display 120. That is, the operator may determine to position the colorimeter 110 for any one of the multiple display areas of the display 120 and perform a color correction operation.

In addition, it should be noted that, in some embodiments, in order to improve the reliability of positioning the colorimeter 110, the display 120 may switch from displaying the first color block to the second color block, in which the color of the second color block is different from the color of the first color block. When the sensing value sensed by the sensor 111 changes correctly in response to the switching of the color blocks, the processor 140 may determine to automatically perform color correction on the display area where the first color block and the second color block are displayed sequentially or specified by the operator. Examples are given below for clear illustration.

Figure 5:
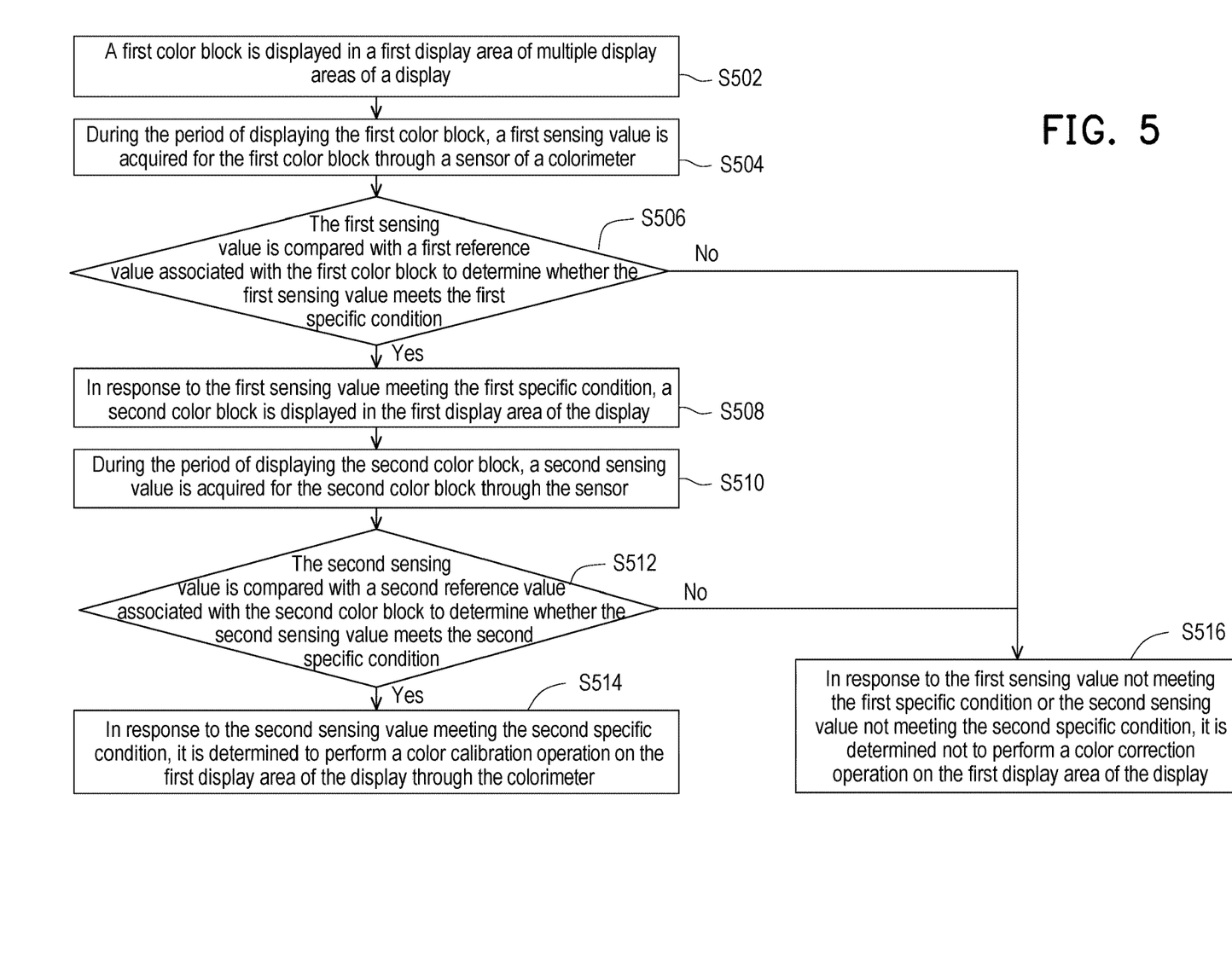
FIG. 5 is a flowchart of a colorimeter positioning method according to an embodiment of the disclosure.
Figure 6A:
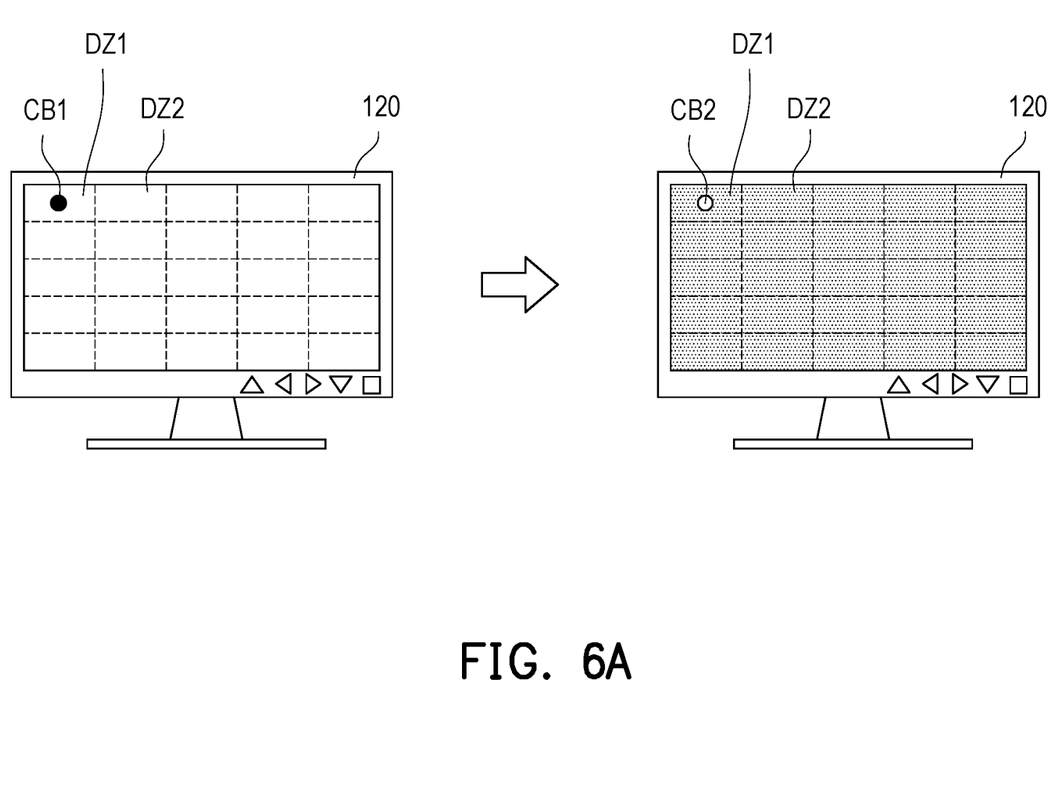
FIG. 6A is a schematic diagram displaying a first color block and a second color block according to an embodiment of the disclosure.

FIG. 5 is a flowchart of a colorimeter positioning method according to an embodiment of the disclosure, and the procedure of the method in FIG. 5 may be implemented by various elements of the color correction system 10 in FIG. 1. In addition, in order to make the concept of the embodiment of the disclosure easier to understand, the following will be supplemented with FIG. 6A and FIG. 6B for illustration. FIG. 6A is a schematic diagram displaying a first color block and a second color block according to an embodiment of the disclosure, and FIG. 6B is a schematic diagram illustrating the operation of a color correction system according to an embodiment of the disclosure.

In step S502, a first color block CB1 is displayed in a first display area DZ1 of multiple display areas of a display 120. In step S504, during the period of displaying the first color block CB1 by using the first display area DZ1, the processor 140 acquires a first sensing value for the first color block CB1 through the sensor 111 of the colorimeter 110. In step S506, the processor 140 compares the first sensing value with a first reference value associated with the first color block CB1 to determine whether the first sensing value meets the first specific condition. The implementation details of step S502 to step S506 are similar to steps S302 to step S306 in the foregoing embodiment, and are not repeated herein.

It should be noted that if the first sensing value meets the first specific condition (determined as "Yes" in step S506), continue to step S508. In step S508, in response to the first sensing value meeting the first specific condition, the processor 140 displays the second color block CB2 in the first display area DZ1 of the display 120. The color of the second color block CB2 is different from the color of the first color block CB1.

Figure 6B:
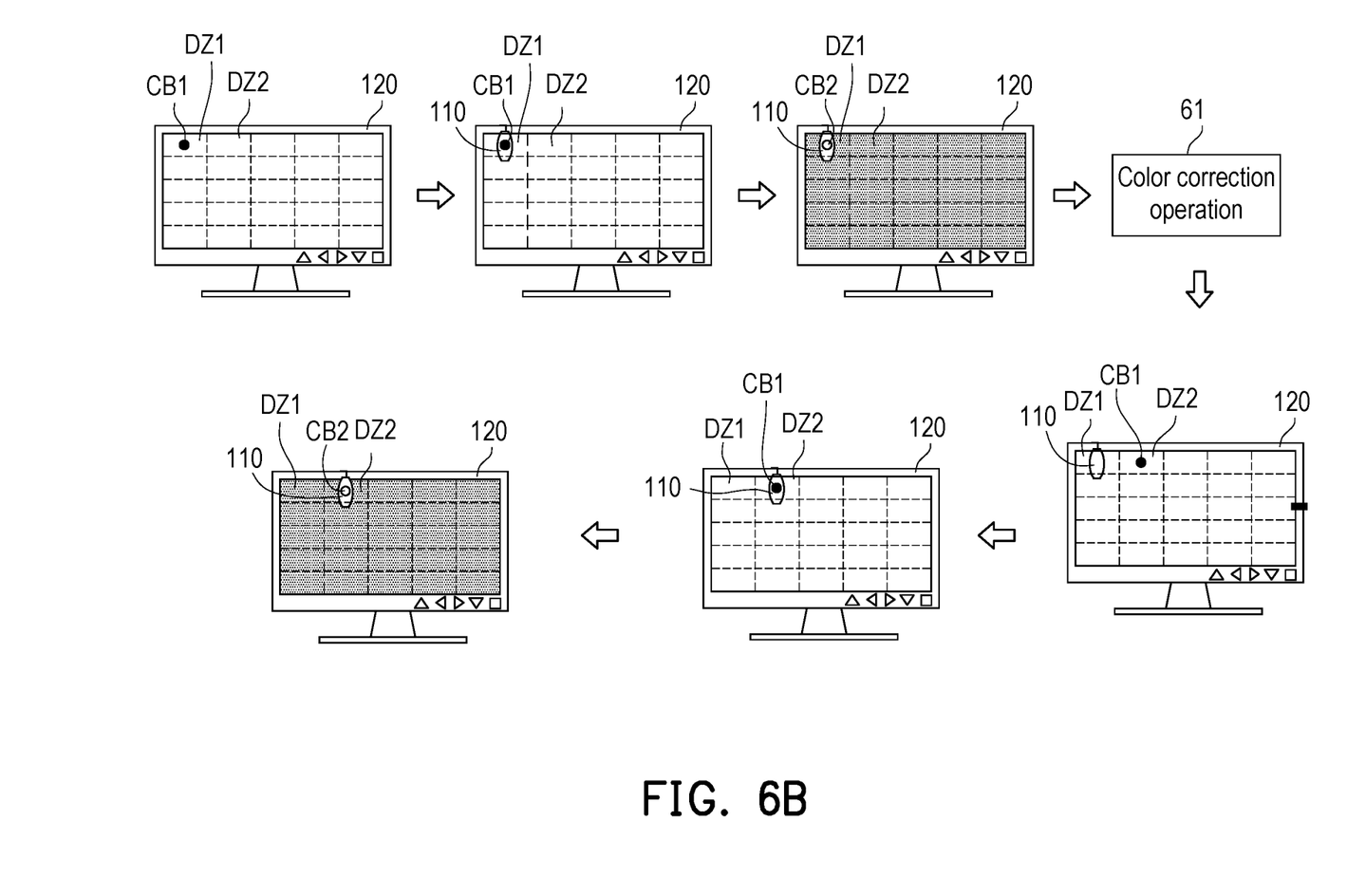
FIG. 6B is a schematic diagram illustrating the operation of a color correction system according to an embodiment of the disclosure.

In some embodiments, as shown in the example of FIG. 6A and FIG. 6B, the color of the first color block CB1 may be black, and the color of the second color block CB2 may be white. Alternatively, in some other embodiments, the color of the first color block may be white, and the color of the second color block may be black. During the period of displaying the second color block CB2 by using the first display area DZ1, the second display area DZ2 different from the first display area DZ1 of these display areas does not display or not fully display the second color block CB2, or does not display or not fully display the color of the second color block CB2. As shown in FIG. 6A, during the period of displaying the second color block CB2 by using the first display area DZ1, not only does the second display area DZ2 not display or fully display the second color block CB2, but other display areas different from the first display area DZ1 do not display or fully display the second color block CB2. It may also be said that multiple other display areas (e.g., the second display area DZ2) different from the first display area DZ1 do not display or not fully display the color of the second color block CB2.

Next, in step S510, during the period of displaying the second color block by using the first display area DZ1, the processor 140 acquires a second sensing value for the second color block CB2 through the sensor 111. Specifically, in the case that the operator has not moved the colorimeter 110, the display 120 may switch from displaying the first color block CB1 to the second color block CB2. Therefore, the colorimeter 110 may sense the second color block CB2 in the first display area DZ1 to acquire the second sensing value, and provide the second sensing value to the processor 140.

In step S512, the processor 140 compares the second sensing value with a second reference value associated with the second color block to determine whether the second sensing value meets the second specific condition. Based on an operation similar to comparing the first sensing value with the first reference value, the processor 140 may determine whether the second sensing value meets the second specific condition according to the comparison result. It should be noted that since the color of the first color block CB1 is different from the color of the second color block CB2, the first reference value is different from the second reference value.

In some embodiments, the second sensing value may include a color coordinate component or a brightness value in a color coordinate system. In some embodiments, the processor 140 may determine whether the second sensing value is within a numerical range based on the second reference value, so as to determine whether the second sensing value meets the second specific condition. In some embodiments, the processor 140 may determine whether the second sensing value is greater than or less than a second reference value. Alternatively, in some other embodiments, the processor 140 may determine whether the difference between the second sensing value and the second reference value is less than a preset value.

For example, assuming that the second color block CB2 is a white block, the processor 140 may determine whether the brightness value provided by the color corrector 110 is greater than a second reference value associated with the white block. When the brightness value provided by the colorimeter 110 is greater than the second reference value associated with the white block, the processor 140 may determine that the second sensing value (i.e., the brightness value) meets the second specific condition. When the brightness value provided by the colorimeter 110 is not greater than the second reference value associated with the white block, the processor 140 may determine that the second sensing value (i.e., the brightness value) does not meet the second specific condition. In this case, the second reference value may be regarded as a brightness threshold.

If the second sensing value meets the second specific condition (determined as "Yes" in step S512), continue to step S514. In step S514, in response to the second sensing value meets the second specific condition, the processor 140 determines to perform a color correction operation 61 on the first display area DZ1 of the display 120 through the colorimeter 110.

On the other hand, if the first sensing value does not meet the first specific condition or the second sensing value does not meet the second specific condition (determined as "No" in step S506 or S512), continue to step S516. In step S516, in response to the first sensing value does not meet the first specific condition or the second sensing value does not meet the second specific condition, the processor 140 determines to not perform a color correction operation 61 on the first display area DZ1 of the display 120 through the colorimeter 110. In this way, the situation that although the first sensing value meets the first specific condition, the colorimeter 110 has not yet been positioned may be avoided. For example, the colorimeter 110 is still placed in the device storage box, and the low brightness value environment in the box makes the processor 140 mistakenly determine that the first sensing value meets the first specific condition, and directly performs the color correction operation.

In addition, in some embodiments, the second sensing value may include multiple second sensing data. Specifically, the processor 140 may control the colorimeter 110 to perform multiple sensing on the second color block CB2 within a preset period of time to correspondingly acquire multiple pieces of second sensing data. In order to ensure that the colorimeter 110 is stably placed above the first display area DZ1, the processor 140 may continuously determine whether the second sensing data meets the second specific condition within a preset period of time. In response to all or at least a portion of the second sensing data meeting the second specific condition within a preset period of time, the processor 140 may determine to perform a color correction operation 61 on the first display area DZ1 of the display 120 through the colorimeter 110.

Please continue to refer to FIG. 6B, after the color correction operation 61 of the first display area DZ1 is completed, the processor 140 may control the second display area DZ2 of the display areas of the display 120 to display the first color block CB1. In this way, the operator may move the colorimeter 110 to be placed above the second display area DZ2 according to the prompt that the display 120 changes to display the first color block CB1 in the second display area DZ2. Similarly, during the period of sequentially displaying the first color block CB1 and the second color block CB2 by using the second display area DZ2, the processor 140 may sequentially determine whether the first sensing value and the second sensing value provided by the colorimeter 110 respectively meet the first specific condition and the second specific condition, to determine whether to automatically start the color correction operation on the second display area DZ2. Through the sensing and determining associated with the second color block CB2, the errors in determining the positioning the colorimeter 110 may be reduced.

However, the embodiments shown in FIG. 4, FIG. 6A and FIG. 6B all take the first color block and the second color block not filling the first display area as an example, but the disclosure is not limited thereto. An example is given below to describe the implementation of filling the first display area with the first color block and the second color block.

Figure 7:
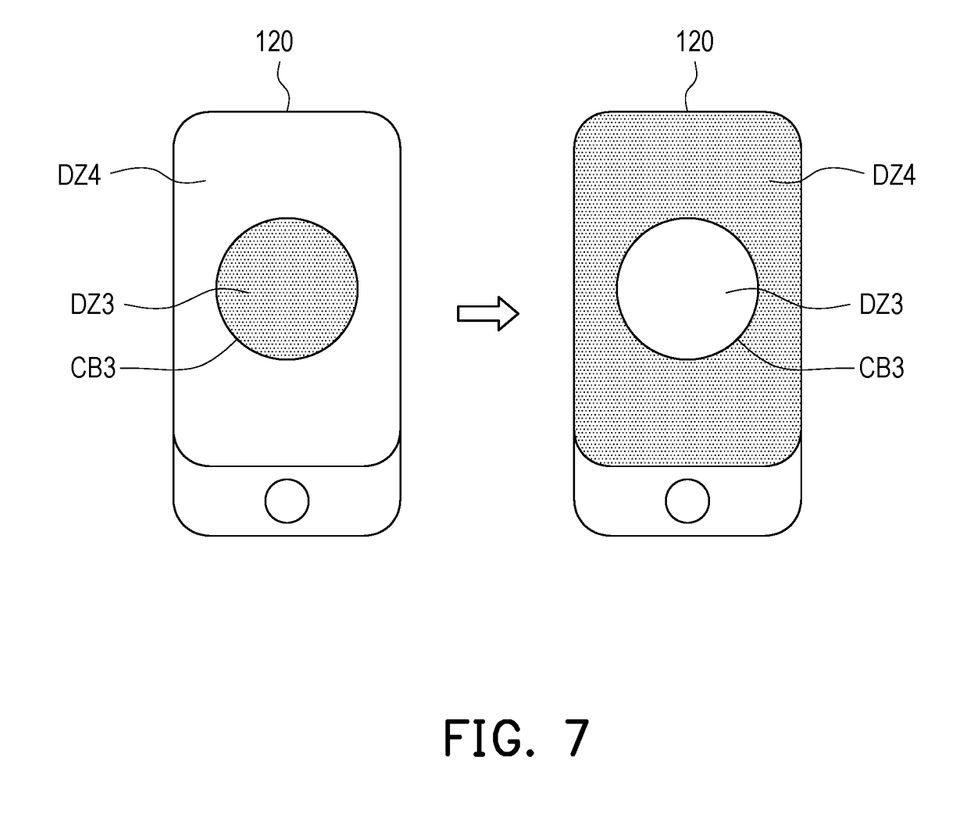
FIG. 7 is a schematic diagram displaying a first color block and a second color block according to an embodiment of the disclosure.

FIG. 7 is a schematic diagram displaying a first color block and a second color block according to another embodiment of the disclosure. Referring to FIG. 7, the display 120 may include two display areas, which are respectively a first display area DZ3 and a second display area DZ4. In this embodiment, the display 120, the storage device 130, and the processor 140 may, for example, be implemented as an electronic display device with a small screen, such as a mobile phone or a gaming console.

First, the processor 140 controls the display 120 to display the first color block CB3 in the first display area DZ3, in which the first color block CB3 fills the first display area DZ3. In this embodiment, the first color block CB3 is described by taking a circular black block as an example, and its shape and size are the same as those of the first display area DZ3. In addition, during the period of displaying the first color block CB3 by using the first display area DZ3, the second display area DZ4 different from the first display area DZ3 does not display or not fully display the first color block CB3 or the color of the first color block CB3.

Then, the operator places the colorimeter 110 on the first display area DZ3 according to the prompt that the display 120 displays the first color block CB3 in the first display area DZ3. During the period of displaying the first color block CB3 by using the first display area DZ3, the processor 140 acquires a first sensing value for the first color block CB3 through the sensor 111 of the colorimeter 110. Afterwards, the processor 140 compares the first sensing value with a first reference value associated with the first color block CB3 to determine whether the first sensing value meets the first specific condition.

In this embodiment, in response to the first sensing value meeting the first specific condition, the processor 140 starts to perform the color correction operation of the display 120, or further displays the second color block CB4 in the first display area DZ3 of the display 120, in which the second color block CB4 fills up the first display area DZ3. In this embodiment, the second color block CB4 is described by taking a circular white block as an example, and its shape and size are the same as those of the first display area DZ3. In addition, during the period of displaying the second color block CB4 by using the first display area DZ3, the second display area DZ4 does not display or not fully display the second color block CB4 or the color of the second color block CB4. Based on this, according to the same operation as the previous embodiment, the processor 140 may determine whether to automatically start the color correction operation of the display 120 according to the first sensing value for the first color block CB3 and the second sensing value for the second color block CB4.

To sum up, in the embodiment of the disclosure, the color blocks are sequentially displayed in each display area of the display or in a specific display area designated by the operator to prompt the operator to place the sensor of the colorimeter on each designated sensing position, which not only provides an intuitive prompting method, but also reduces human error. In addition, if the sensed value of the color block detected by the colorimeter meets a specific condition, the embodiment of the disclosure may automatically start the color correction operation without the operator giving an additional command to start the color correction operation. Based on this, not only may the efficiency and operation convenience of the color correction process be greatly improved, but also good color correction results may be ensured.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A colorimeter positioning method, comprising:
   displaying a first color block in a first display area of a plurality of display areas of a display;
   acquiring a first sensing value for the first color block through a sensor of a colorimeter during a period of displaying the first color block;
   comparing the first sensing value with a first reference value associated with the first color block to determine whether the first sensing value meets a first specific condition;
   in response to the first sensing value meeting the first specific condition, displaying a second color block in the first display area of the display;
   acquiring a second sensing value for the second color block through the sensor during a period of displaying the second color block; and
   comparing the second sensing value with a second reference value associated with the second color block to determine whether the second sensing value meets a second specific condition.

2. The colorimeter positioning method according to claim 1, further comprising:
   in response to the second sensing value meeting the second specific condition, determining to perform a color correction operation on the first display area of the display through the colorimeter; and
   in response to the first sensing value not meeting the first specific condition or the second sensing value not meeting the second specific condition, determining not to perform the color correction operation on the first display area of the display.

3. The colorimeter positioning method according to claim 2, further comprising:
   displaying the first color block in a second display area of the display areas of the display after the color correction operation of the first display area is completed.

4. The colorimeter positioning method according to claim 2, wherein the second sensing value comprising a plurality of second sensing data, and in response to the second sensing value meeting the second specific condition, determining to perform the color correction operation on the first display area of the display through the colorimeter comprises:
   in response to at least a portion of the second sensing data meeting the second specific condition within a preset period of time, determining to perform the color correction operation on the first display area of the display through the colorimeter.

5. The colorimeter positioning method according to claim 1, wherein the first specific condition comprises that the first sensing value is within a numerical range based on the first reference value.

6. The colorimeter positioning method according to claim 1, wherein the first sensing value comprises a plurality of first sensing data, and in response to the first sensing value meeting the first specific condition, displaying the second color block in the first display area of the display comprises:
   in response to at least a portion of the first sensing data meeting the first specific condition within a preset period of time, displaying the second color block in the first display area of the display.

7. The colorimeter positioning method according to claim 1, wherein during a period of displaying the first color block, a second display area different from the first display area of the display areas does not completely display the first color block or a color of the first color block.

8. The colorimeter positioning method according to claim 1, wherein during a period of displaying the second color block, a second display area different from the first display area of the display areas does not completely display the second color block or a color of the second color block, and the color of the second color block is different from a color of the first color block.

9. The colorimeter positioning method according to claim 8, wherein the color of the first color block is white and the color of the second color block is black, or the color of the first color block is black and the color of the second color block is white.

10. The colorimeter positioning method according to claim 1, wherein the first sensing value comprises a color coordinate component or a brightness value in a color coordinate system.

11. A color correction system, comprising:
    a colorimeter, comprising a sensor;
    a display, comprising a plurality of display areas;
    a storage device, recording a plurality of modules; and
    a processor, coupled to the colorimeter, the display, and the storage device, and configured to:

control the display to display a first color block in a first display area of the display areas;
acquire a first sensing value for the first color block through the sensor during a period of displaying the first color block;
compare the first sensing value with a first reference value associated with the first color block to determine whether the first sensing value meets a first specific condition; and
in response to the first sensing value meeting the first specific condition, determine to perform a color correction operation on the first display area of the display through the colorimeter, or in response to the first sensing value not meeting the first specific condition, determine not to perform the color correction operation on the first display area of the display.

12. The color correction system according to claim 11, wherein the first specific condition comprises that the first sensing value is within a numerical range based on the first reference value.

13. The color correction system according to claim 11, wherein the first sensing value comprises a plurality of first sensing data, the processor is further configured to:
in response to at least a portion of the first sensing data meeting the first specific condition within a preset period of time, determine to perform the color correction operation on the first display area of the display through the colorimeter.

14. The color correction system according to claim 11, wherein during a period of displaying the first color block, a second display area different from the first display area of the display areas does not completely display the first color block.

15. The color correction system according to claim 11, wherein the processor is further configured to:
in response to the first sensing value meeting the first specific condition, display a second color block in the first display area of the display;
acquire a second sensing value through the colorimeter during a period of displaying the second color block;
compare the second sensing value with a second reference value associated with the second color block to determine whether the second sensing value meets a second specific condition; and
in response to the second sensing value meeting the second specific condition, determine to perform the color correction operation on the first display area of the display through the colorimeter.

16. The color correction system according to claim 15, wherein the processor is further configured to:
in response to the second sensing value not meeting the second specific condition, determine not to perform the color correction operation on the first display area of the display.

17. The color correction system according to claim 15, wherein during a period of displaying the second color block, a second display area different from the first display area of the display areas does not completely display the second color block, and the color of the second color block is different from a color of the first color block.

18. The color correction system according to claim 17, wherein the color of the first color block is white and the color of the second color block is black, or the color of the first color block is black and the color of the second color block is white.

19. The color correction system according to claim 11, wherein the first sensing value comprises a color coordinate component or a brightness value in a color coordinate system.

20. The color correction system according to claim 11, wherein the processor is further configured to:
display the first color block in a second display area of the display areas of the display after the color correction operation of the first display area is completed.

* * * * *